(12) United States Patent
Lavinio

(10) Patent No.: US 9,646,143 B2
(45) Date of Patent: May 9, 2017

(54) SEMANTIC OBFUSCATION OF DATA IN REAL TIME

(71) Applicant: Progress Software Corporation, Bedford, MA (US)

(72) Inventor: Anthony Lavinio, Southampton, MA (US)

(73) Assignee: Progress Software Corporation, Bedford, MA (US)

( * ) Notice: Subject to any disclaimer, the term of this patent is extended or adjusted under 35 U.S.C. 154(b) by 0 days.

(21) Appl. No.: 14/935,157

(22) Filed: Nov. 6, 2015

(65) Prior Publication Data

US 2016/0134595 A1    May 12, 2016

Related U.S. Application Data

(63) Continuation of application No. 14/102,360, filed on Dec. 10, 2013, now Pat. No. 9,223,995.

(51) Int. Cl.
*G06F 21/14* (2013.01)
*G06F 21/60* (2013.01)
*G06F 21/10* (2013.01)
*G06F 21/62* (2013.01)
*H04L 29/06* (2006.01)

(52) U.S. Cl.
CPC ............. *G06F 21/14* (2013.01); *G06F 21/10* (2013.01); *G06F 21/606* (2013.01); *G06F 21/6254* (2013.01); *H04L 63/0421* (2013.01); *H04L 63/0428* (2013.01)

(58) Field of Classification Search
CPC .. H04L 63/0428; H04L 2209/16; G06F 21/14; G06F 21/6254
See application file for complete search history.

(56) References Cited

U.S. PATENT DOCUMENTS

| | | | |
|---|---|---|---|
| 6,084,966 A * | 7/2000 | Maebara | H04L 9/0662 380/42 |
| 2002/0078026 A1* | 6/2002 | Fergus | G06F 3/0622 |
| 2004/0139340 A1* | 7/2004 | Johnson | G06F 21/14 713/194 |
| 2008/0127125 A1* | 5/2008 | Anckaert | G06F 21/53 717/136 |
| 2008/0133531 A1* | 6/2008 | Baskerville | G06F 21/6254 |
| 2008/0208697 A1* | 8/2008 | Kargman | G06Q 20/204 705/17 |
| 2010/0042583 A1* | 2/2010 | Gervais | G06Q 40/08 707/757 |
| 2011/0173676 A1* | 7/2011 | Peckover | G06F 21/6245 726/3 |

(Continued)

*Primary Examiner* — Dao Ho
(74) *Attorney, Agent, or Firm* — Patent Law Works LLP

(57) ABSTRACT

Systems and methods for automatically maintaining the anonymity or privacy of a stream of data as it is transmitted over a network or provided for other use, by receiving a data stream in real-time from an original source and identifying a data subset of interest within the original data stream. The data subset of interest is segregated from the data stream for either obfuscating at least a portion of the data subset in accordance with certain criteria or encrypting it. The data subset is obfuscated or encrypted for purpose of transmission over the network or for testing and reunited at a target source with the remainder of the data stream.

18 Claims, 9 Drawing Sheets

(56) References Cited

U.S. PATENT DOCUMENTS

| | | | |
|---|---|---|---|
| 2012/0030165 A1* | 2/2012 | Guirguis | G06F 19/322 707/607 |
| 2013/0173906 A1* | 7/2013 | Obligacion | H04L 63/0428 713/151 |
| 2015/0121525 A1* | 4/2015 | Amoroso | H04L 63/1441 726/23 |

* cited by examiner

SEMANTIC OBFUSCATION OF DATA IN REAL TIME

CROSS-REFERENCE TO RELATED APPLICATIONS

The present application claims priority under 35 U.S.C. §120 to U.S. patent application Ser. No. 14/102,360 entitled "Semantic Obfuscation of Data in Real Time," filed Dec. 10, 2013, the entire content of which is incorporated by reference herein.

Applicants hereby notify the USPTO that the claims of the present application are different from those of the aforementioned related application. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

FIELD OF INVENTION

The present disclosure relates to maintaining the privacy of a continuous data stream as it is either passed through one or more sources in real-time or used for other purposes and more particularly, to transformation of select subsets of the data that are handled differently.

BACKGROUND

Transfer of data for myriad reasons is essential and ubiquitous in today's environment. Yet, the security and privacy of data as it is transferred from one source to another is critical, particularly depending upon the nature of the data or if it is transferred over the internet. In some instances, the data may be highly sensitive, for example, as in patient medical records. As another example, in facilitating the handling of transactions, business entities frequently transmit business transaction data electronically in a strict format over common communications networks. The electronic data interchange (EDI) is one of the ways. In EDI, business data is formatted according to one or more known and approved standards, such as ANSI X12 or EDIFACT. For example, the EDI data representing various transactions are transmitted as a batch of delineated documents, and each of the delineated documents is encoded according to strict formatting rules to ensure the destination application receiving the documents is able to successfully parse and consume the information for down-stream processing. In parsing and processing the EDI messages, existing systems transmit EDI data and include the formatting rules or schemas (structure of file) in each delineated document during the interchange.

In some instances, such types of sensitive data are generally transferred through a plurality of sources to reach its final destination. To perform secure transfer of data, while maintaining its privacy, various schemes to encrypt, authenticate, or otherwise maintain the anonymity of the data are employed. This is especially in instances there the data transfer is performed over the internet or public networks.

Some ways to secure privacy of data is to produce randomized data or encrypt data, while preserving the file structure. This is beneficial in situations where customers have data that they do not want to share with others. For example, in addition to the EDI example, in the health-care industry, customer data is often transferred among sources, for example, from one health-care provider to another. With such transfers it is important to keep the order of the data the same, while maintaining the privacy of the data or at least a subset or portion of the data.

SUMMARY

In accordance with some embodiments of the system and methods of the present disclosure, subsets of data that are sensitive are separated from data originating at a particular source and at least a portion of the data is either obfuscated or encrypted to maintain the privacy and anonymity of the data as it is either transmitted to a target source or used for test purposes. In some embodiments, the structural information of the data files are separated from the content components and left in plain text, before the data is transmitted, and only the content components or at least a portion of them are either obfuscated (e.g., replaced with similar or random data) or encrypted. On reaching its final destination, the content components are merged or reunited with the control components.

In some embodiments of the present disclosure, only a portion of the data is selected in a particular data file, and before transmission to its final destination or other use, a portion of the data is either separated or extracted and either obfuscated or encrypted based on designated criteria. In some embodiments, the data structure is maintained and only the content component is scrambled.

In some embodiments, the system and methods of the present disclosure analyze the file structure of data in a data stream that has been designated for either testing or transfer, identify portions of the file to be randomized or encrypted, based on the use (e.g., test or transfer), and then either randomize or encrypt the portions of the data stream. The system and methods may perform this functionality to either generate test data for contractors or to effect transfer of continuous stream of data in real-time among designated locations for myriad purposes. For example, for transfer of XML or EDI files, the system may be configured to either automatically encrypt or obfuscate data, each time the system finds the data designated in the continuous stream of data. The system starts the transfer of the continuous stream of data and on finding any instance of the data for obfuscation or encryption, it extracts the data designated and either randomizes or encrypts it in one big string. Various different criteria may be used for obfuscating data. In some instances, the system replaces each letter in a word with a letter beside it in the alphabet. For example, the letter "K" may be replaced with either "L" or "J." In some instances, the obfuscation criteria, contained in the obfuscation key, may be dynamically changed, as the system processes each character. It should be recognized that the system and methods of the present disclosure, select pieces or portions of interest from a content data file, based on use, and then encrypt those pieces or portions of content, without affecting the file structure or order of the data in the file.

As indicated above, in some instances, the system or methods can take the pieces or portions for testing data (e.g. a contractor, a vendor receiving a notification of a system malfunction from a client, and the like). In most instances, the system first analyzes a data file, identifies the portions to be masked or concealed, isolates or extracts the portions and then executes the transformation process (either by obfuscation or encryption). In instances where the data files (in a continuous stream or otherwise) are designated for transfer, the data that is isolated is reunited at the other end or final destination to which the data is routed. In instances where the files are designated for testing, results of the testing may be recorded to address quality assurance issues and the like.

In some embodiments, the system and methods of the present disclosure perform partial obfuscation or encryption of data in real-time based on the semantic layer of the data. Examples of use include, but are not limited to, instances where data must be passed from one entity through another to a third entity. The nature of the data may be sensitive therefore, it is necessary to conceal the content of the data from the intermediary. Yet the intermediary may be required to view certain portions of the data, to create checksums and totals on other portions, to ensure secure and proper transfer of data. In other examples, data may be aggregated from several entities for research purposes, but it may be desirable to have some subsets of data obfuscated within certain parameters, such as randomization of names, replacement of IP addresses with other addresses within the general vicinity, and other statistically-meaningless, but privacy-protecting ways.

In yet another example, it may be required or desirable for data to be passed from a customer to a vendor to demonstrate a defect, yet the data itself on which the customer is working is sensitive.

In some embodiments, some subset of data from a continuous stream of data is channeled into at least one alternate path, based on some criteria, to be handled differently, but then the subset is reunited with the original stream. This transformation of the data stream may be either reversible (where the subset of data is encrypted) or irreversible (where the data is replaced with similar but random data resembling the original data or completely random data). The separation of subset data is easily executed because in some embodiments, the main or original data set from which the subset is extracted, may reside in some repository or catalog. The schema stored in the repository or catalog indicates which portions of the main data stream are to be extracted and either encrypted or randomized (obfuscated). The separation mechanism is either a set of rules, such as a list of XPath expressions, or a simple list of field/column/element names. In some instances, the data may be selected by position (e.g. 5th element in rows starting with "PRN" etc.) or by deeper semantic usage (e.g., of all names, select only lessee names or shipping dates etc.). The separation mechanism may be implemented into a driver, so that neither the original data source nor the target is modified.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
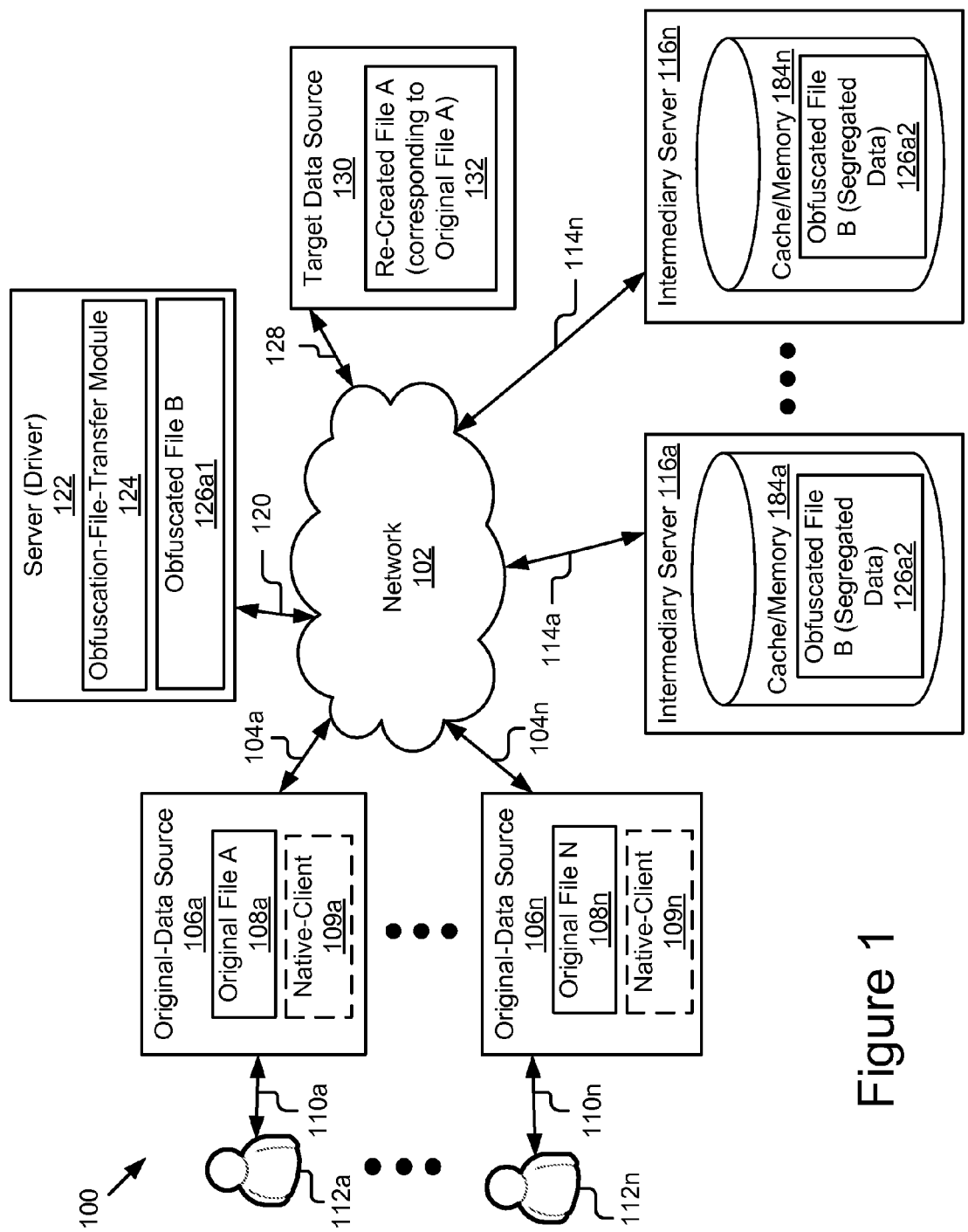
FIG. 1 is a block diagram illustrating an example system for maintaining the privacy and anonymity of data or files when transferring from one source to another, according to some embodiments.

Data transfer involves transmission through networks that may or may not be secure. In many instances, data may be transferred from its original sources to its final destination through one or more intermediary sources. In many instances, the data may be sensitive and intended only for viewing or processing at its final destination. In such instances it is necessary to maintain the data secret or private as it is transmitted over the communication networks. In accordance with some embodiments of the present disclosure, this type of data is separated. In some embodiments, the control components of the data (controlling the file structure etc.) are separated from the content components, before the data is transmitted, and only the content components (at least a portion or subset) are either encrypted or randomized. On reaching its final destination, the content components are merged or reunited with the control components.

In some embodiments of the present disclosure, only a portion of the data is selected in a particular file, before transmission, and either the entire portion or a portion of it is encrypted before transmission to its final destination. In some embodiments, the data structure is maintained and only the content data is scrambled. In some embodiments, select data may be obfuscated or encrypted for testing purposes, for example, in instances where a contractor has to test or debug particular software. In some embodiments, only select data may be identified for either obfuscating or encrypting it, at its original source, in order for concealing it from others, for example, intermediary sources, during transmission from the original source to the final source.

In some embodiments, the system and methods of the present disclosure analyze the file structure of data in a data stream that has been designated for either testing or transfer, identify portions of the file to be randomized or encrypted, based on the use (e.g., test or transfer), and then either randomize or encrypt the portions of the data stream. The system and methods may perform this functionality to either generate test data for contractors or to effect transfer of continuous stream of data in real time among designated locations for myriad purposes. For example, for transfer of XML or EDI files, the system may be configured to either automatically encrypt or obfuscate data, each time the system finds the data designated in the continuous stream of data. The system may start the transfer of the continuous stream of data and on finding any instance of the data for obfuscation, it extracts the data designated and encrypts it in one big string. Various different criteria may be used for obfuscating data. In some instances, the system replaces each letter in a word with a letter beside it in the alphabet.

For example, the letter "K" may be replaced with either "L" or "J." In some instances, the obfuscation criteria, contained in an obfuscation index or the like, or encryption key, may be dynamically changed or executed, as the system processes each character. It should be recognized that the system and methods of the present disclosure, select pieces or portions of interest from a file, based on use, and then encrypt those pieces or portions, without affecting the file. As indicated above, in some instances, the system or methods can take the pieces or portions for testing data (e.g. a contractor, a vendor receiving a notification of a system malfunction from a client, and the like). In most instances, the system first analyzes a data file, identifies the portions to be masked or concealed, isolates or extracts the portions and then executes the obfuscation methods or encryption key. In instances where the files are designated for transfer, the data that is isolated in reunited at the other end or destination where the data is transferred. In instances where the files are designated for testing, results of the testing may be recorded to address quality assurance issues and the like.

The system and methods of the present disclosure perform partial obfuscation or encryption of data in real-time based on the semantic layer of the data. Examples of use include, but are not limited to, instances where data must be passed from one entity through another to a third entity. The nature of the data may be sensitive therefore, it is necessary to conceal the content of the data from the intermediary. Yet the intermediary may be required to view and control certain portions of the data, to create checksums and totals on other portions, to ensure secure and proper transfer of data. In other examples, data may be aggregated from several entities for research purposes, but it may be desirable to have some subsets of data obfuscated within certain parameters, such as randomization of names, replacement of IP addresses with other addresses within the general vicinity, and other statistically-meaningless, but privacy-protecting ways. In yet another example, it may be required or desirable for data to be passed from a customer to a vendor to demonstrate a defect, yet the data itself on which the customer is working is sensitive.

The core technology lies in that in a continuous stream of data, some subsets of data is channeled into at least one alternate path, based on some criteria, to be handled differently or transformed, and then the subsets are reunited with the original or main stream. This transformation of the data stream may be either reversible (where the subset of data is encrypted using a encryption key) or irreversible (where the data is replaced with similar but random data or completely random data). The separation of subset data may be easily executed because the main data resides in some repository or catalog, and the schema in the repository or catalog indicates which portions of the main data stream are to be either encrypted or randomized (obfuscated). The separation mechanism is either a set of rules, such as a list of XPath expressions, or a simple list of field/column/element names. In some instances, the data may be selected by position (e.g. 5th element in rows starting with "PRN" etc.) or by deeper semantic usage (e.g., of all names, select only lessee names or shipping dates etc.). The separation mechanism may be implemented into a driver, so that neither the original data source nor the target source is modified. In some embodiments, a pure type 4 Java Driver is used, eliminating dependencies on native operating functionality.

Some types of obfuscation criteria may include, but are not limited to, one or more of the following: 1) replacement of personal names with random strings; 2) replacement of addresses with nearby addresses, with postal code adjustments; 3) obliteration of the actual insurance premiums (in a health-care example) but transmittal of the limits; 4) removal of personal information from HIPAA (Health Insurance Portability and Accountability Act) and EDI documents, but with preservation of procedure data, so as to keep the valid file structures of HIPAA and EDI interchanges; 5) selection of data but with randomization of dates within a certain plus or minus number of days to produce test data; and 6) encryption of all data except that necessary in the exchange envelope and that necessary for checksum calculation, and subsequent decryption (via a key).

The system and methods of the present disclosure could apply to different data models, for example, relational data, "flat" files, EDI, trees (such as XML or JSON), or more complicated objects—anything that may be serialized.

FIG. 1 is a block diagram illustrating an example system 100 for secure and private file transfer according to some embodiments of the present disclosure. The illustrated system 100 includes one or more original data sources 106a . . . 106n, one or more intermediary servers 116 . . . 116n, a server 122, and a target source 130, all of which are communicatively coupled via a network 102 for interaction with one another. For example, the original data sources 106a . . . 106n (also referred to individually and collectively as 106) may be respectively coupled to the network 102 via signal lines 104a . . . 104n and may be accessed by users 112a . . . 112n (also referred to individually and collectively as 112) as illustrated by lines 110a . . . 110n. The users 112a . . . 112n may have access to the original data sources 106a . . . 106n to provide data files (in a continuous stream and/or in real-time), either directly or indirectly. For example, in cases where medical records are compiled for transfer and subsequent processing. In this example, the users 112a . . . 112n represent either the patients themselves, hospital or other health-care facility personnel, or financial personnel, any of whom may be providing sensitive information to the original data sources 106a . . . 106n. The data sources 106a . . . 106n represent a repository, database, catalog, and the like. The intermediary servers 116 . . . 116n may be coupled to the network 102, via signal lines 114 . . . 116. The intermediary servers represent sources through which sensitive data may be routed on the way to a final destination. The server 122 may be coupled to the network 102, via signal line 120. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The original data sources 106 . . . 106n are computing devices having data processing and communication capabilities. Although FIG. 1 illustrates two original data sources 106a . . . 106n, the present specification applies to any system architecture having one or more original data sources 106 . . . 106n. It should be recognized that data for either test or transfer, may originate at either one or more of the original data sources 106 . . . 106n. The data streams may originate but be combined or aggregated before it is transmitted via the network 102. In some embodiments, an original data source 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of original data sources 106 . . . 106n may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. Although two or more original data sources 106 . . . 106n are depicted in FIG. 1, the system 100 may include any number of original data sources 106. In addition, the original data sources 106a . . . 106n may be the same or different types of computing devices. In the implementation that is depicted, the original data sources 106a . . . 106n, respectively, in the event they are client devices, may contain instances 109a . . . 109n of a native-client 109 (also referred to individually and collectively as native-client 109 and illustrated by broken lines). The native-client 109 may be stored in a memory and executable by a processor of an original data source (a client device in this instance) 106. In some embodiments, the original data source (a client device) 106 may also include applications for making telephone calls, video calls, messaging, social networking, gaming, capturing digital video, and/or images, authoring documents, etc.

The intermediary server 116 . . . 116n may include one or more computing devices having data processing, storing, and communication capabilities. For example, the intermediary server 116 may include one or more hardware servers, server arrays, storage devices, systems, etc., and/or may be centralized or distributed/cloud-based. In some implementations, the intermediary servers 116 . . . 116n may include one or more virtual servers, which operate in a host server environment and access the physical hardware of the host server including, for example, a processor, memory, storage, network interfaces, etc., via an abstraction layer (e.g., a virtual machine manager). In one embodiment, the intermediary server 116 may include a cache 184 for temporarily storing files. For example, an obfuscated file, such as Obfuscated File B 126a, may have a first copy 126a1 stored on the server 122, after a subset of the data is extracted from a main data stream (to create Obfuscated File B). A second copy 126a2 may be stored in the cache 184 of the intermediary server 116 when an Obfuscated File B is extracted from a main data stream. The Obfuscated File B is stored with the remaining data in the data stream, as both are routed or transmitted along separate channels, as they are sent to the target data source 130, by the server 122 over an unsecured connection (e.g. HTTP). Although the operations and file described describe an example of obfuscation, it should be recognized that similar operations to encrypt may result in the creation of encrypted files that are designated accordingly and stored.

Depending on the embodiment and use, the intermediary server 116 may be a proxy server, an accelerator, an intranet server, a Content Delivery Network (CDN) or any other computing device or group of computing devices that caches copies of files transferred from original data sources 106a . . . 106n by servers such as server 122 (e.g., a driver) across a network 102. Such caching may beneficially allow the intermediary server 116 to route the data stream to multiple destinations (e.g., target data source 130) in real-time or subsequently, in the event of subsequent requests for the same data that may be answered by the intermediary server 116 routing a cached copy of the file, thereby decreasing the load on the network 102, the direct requests to the server 122 (which may save the operator of server 122 time and money because of lower bandwidth consumption) and provide the data to one or more target destinations more quickly than if the request in every instance has to travel to and be fulfilled by the server 122.

Depending on the embodiment and use, the target data source 130 may be a proxy server, an accelerator, an intranet server, a Content Delivery Network (CDN) or any other computing device or group of computing devices that receives and stores data files transferred from the original data sources 106a . . . 106n by servers such as server 122 (e.g., a driver) across a network 102. The obfuscated File B is reunited with the remaining data from which it is extracted and stored as the original data (File A) that was identified and transferred from the original data sources 106a . . . 106n. It should be recognized that in some instances, any subset of data that is extracted from an original or main data stream may be separated only for the duration of time necessary to encrypt a particular value within the subset of data. The subset of data with the encrypted value is then reinserted into the mainstream of data flow. In some instances, the subset of data with the encrypted value may be rejoined with the mainstream data at a later point, after the duration of time necessary to encrypt the particular value.

It should be understood that the system 100 illustrated in FIG. 1 is representative of an example system for secure and private file transfer according to some embodiments and that a variety of different system environments and configurations are contemplated and are within the scope of the present disclosure. For instance, various functionality may be moved from a server to a client device, or vice versa and some implementations may include additional or fewer computing devices, services, and/or networks, and may implement various functionality on the client or server-side. Further, various entities of the system 100 may be integrated into to a single computing device or system or additional computing devices or systems, etc.

Figure 2:
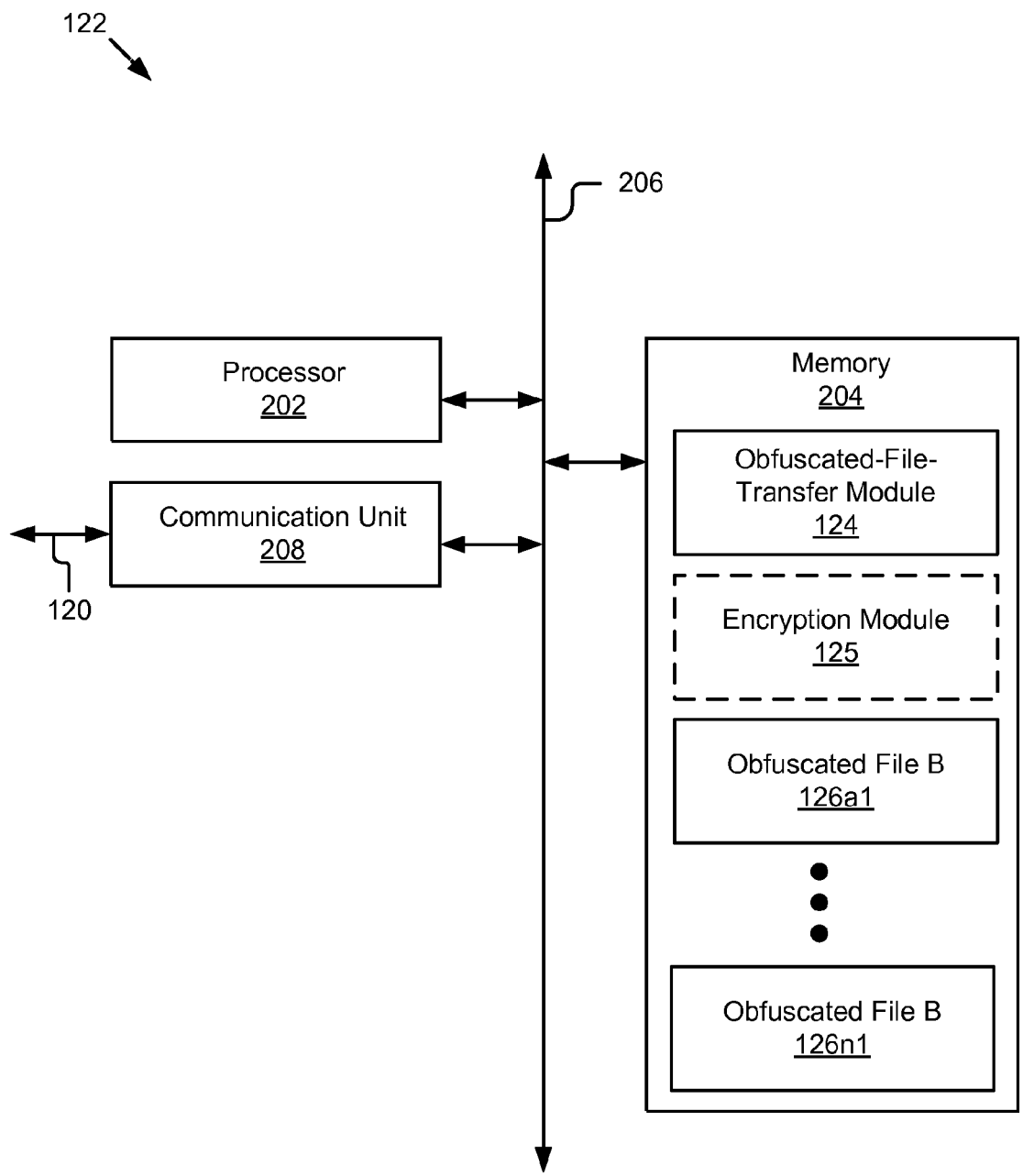
FIG. 2 is a block diagram illustrating an example server with an obfuscation-file-transfer module (an example of a data transformation module) according to some embodiments.

FIG. 2 is a block diagram of an example server 122 according to some embodiments. In some implementations, the server 122 is configured to provide the driver software for executing the system and methods described in the present disclosure. In other implementations, the server 122 may be configured to cooperate with the original data sources (106a . . . 106n) to channel subsets of data identified for obfuscation (and encryption) on one or more alternate paths, depending upon the use. The server 122, as illustrated, may include a processor 202, a memory 204, a communication unit 208, which may be communicatively coupled by a communications bus 206. The server 122 depicted in FIG. 2 is provided by way of example and it should be understood that it may take other forms and include additional or fewer components without departing from the scope of the present disclosure. For example, while not shown, the server 122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described here can be applied to multiple entities in the system 100, with various modifications, including, for example, in the intermediary server 116 (e.g. by omitting the cache/memory 184 and only including a obfuscation-file-transfer module) and the original-data source 106 (e.g. by including a file-transfer module and omitting a native-client 109).

The processor 202 may execute code, routines and software instructions by performing various input/output, logical, and/or mathematical operations. The processor 202 has various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the server 122 including, for example, the memory 204 and communication unit 208.

The memory 204 may store and provide access to data to the other components of the server 122. In some implementations, the memory 204 may store instructions and/or data that may be executed by the processor 202. For example, as depicted, the memory 204 may store the obfuscation module 124, an encryption module 125 (shown in broken lines to indicate that it is optional in systems where only randomization of data is performed) and obfuscated (and/or encrypted files) files B1-Bn, indicated by reference numerals 126a1-126an. The memory 204 is also capable of storing other instructions and data, including, for example, an operating system, hardware drivers, other software applications, databases, etc. The memory 204 may be coupled to the bus 206 for communication with the processor 202 and the other components of the server 122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 204 may be a single device or may include multiple types of devices and configurations.

The bus 206 can include a communication bus for transferring data between components of a server 122 or between computing devices 106/116/122/130, a network bus system including the network 102 or portions thereof, a processor mesh, a combination thereof, etc. In some implementations, the obfuscated file transfer module 124, its sub-components 322, 324, 326, 328, 330, 332 and various other software operating on the server 122 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100, 500, 600A, 600B using various standard network communication protocols, including, for example, those discussed elsewhere herein.

In some embodiments, a storage device (not separately shown) may also be included. A storage device is an information source for storing and providing access to data. In some implementations, the storage device may be coupled to the components 202, 204, and 208 of the computing device via the bus 206 to receive and provide access to data. In some implementations, the storage device may store the obfuscated (and encrypted) files 126a1-126n1 and provide access to the obfuscated (and encrypted) files 126a1-126n1 according to the description below.

The storage device (not separately shown) may be included in the server 122 and/or a storage system distinct from but coupled to, or accessible by, the server 122. The storage device can include one or more non-transitory computer-readable mediums for storing the data. In some implementations, the storage device may be incorporated with the memory 204 or may be distinct therefrom. In some implementations, the storage device may include a database management system (DBMS) operable on the server 122. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations.

As mentioned above, the server 122 may include other and/or fewer components. Examples of other components may include a display, an input device, a sensor, etc. (not shown). In one embodiment, the server 122 includes a display. The display may display electronic images and data for presentation to a user at the original data source 106 or the target data source 130. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the server 122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 with access to the original data source 106 may interact with an emulated (i.e., virtual or soft) keyboard displayed on the touch-screen display by using fingers to contacting the display in the keyboard regions, for example, to download or execute driver software provided by the server 122.

Example Obfuscated File Transfer Module 124 (and Encryption Module 125)

Referring now to FIG. 3, the obfuscated-file-transfer module 124 is shown in more detail according to some embodiments of the present embodiment. FIG. 3 is a block diagram of the obfuscated-file-transfer module 124 included in the server 122 according to some embodiments.

The obfuscated-file-transfer module 124 provides for transfer of obfuscated (and encrypted) files or data streams. In some embodiments, the obfuscated-file-transfer module 124 provides for private file or data transfer by obfuscating one or more designated portions of a file to be shared with another entity or a group of entities, via intermediary sources. The obfuscated-file-transfer module 124 segregates a packet of information designated for obfuscation according to certain criteria that is specified.

In some embodiments, the obfuscated-transfer module 124 comprises an interface module 322, a data-subset-identification module 324, a data-segregation module 326, an obfuscation-criteria-determination module 328, a data-transformation module 330 and a data-recreation module 332 (also referred to as a data-reuniting module). It will be recognized that the modules 322, 324, 326, 328, 330, 332 comprised in the obfuscation file transfer module 124 are not necessarily all on the same server 122. In some embodiments, the modules 322, 324, 326, 328, 330, 332 and/or their functionality are distributed across multiple servers 122 and/or other computing devices, arranged in a distributed environment. For example, FIGS. 5 and 6 disclose system configurations 500 and 600, respectively, which are for client-vendor uses, which may include a notification server 142 and a notification module 330 included therein. The client-vendor uses are directed to an application when a client must notify a vendor of a malfunction detected on a client device.

The interface module 322 includes code and routines for determining receipt of an incoming stream of continuous data that is designated for either test or transfer to a target destination. In some embodiment, the interface module 322 is a set of instructions executable by the processor 202. In another embodiment, the interface module 322 is stored in the memory 204 and is accessible and executable by the processor 202. In either embodiment, the interface module 322 is adapted for cooperation and communication with the processor 202, other components of the server 122 and other components of the obfuscated file transfer module 124.

A data stream as used herein may include a continuous stream of newly created files and/or updated or revised, existing files. A file as referred to here is a collection of data treated as a unit. Examples of files may include, but are not limited to, one or more of documents, images, animations, spreadsheets, videos, text, audio, etc. It should be recognized that the preceding are merely examples of files and that other files exist and that files may have various formats. For clarity and convenience, this description uses a medical document including insurance information and social security numbers of Company A's employees as an example of a file. This example is merely one of many possible and has been selected because one expects that the employees and Company A would not want the information in this file generally accessible by those for who the information is not intended (e.g., intermediary sources instrumental in the transfer of the data); yet, intermediary sources executing the transfer of the data may need to perform certain control functions on the data.

The interface module 322 determines an incoming data stream of files designated for either test or transfer. In some embodiments, the interface module 322 determines an incoming data stream of files or updates to it implicitly. For example, in some embodiments, the interface module 322 automatically determines that a new data stream of files exists when it detects that files are either saved or uploaded (e.g. by HTTP POST) to the server 122. In some embodiments, the interface module 322 determines that files are designated for either test or transfer explicitly. For example, in some embodiments, the interface module 322 may perform analysis of metadata such as examining an instruction, a version of a file that has to be updated, last modified date, hash, author, etc. associated with the files to determine whether the files are designated. It should be recognized that the preceding are merely examples of determining files or data designated for either test or transfer and that other examples may be used without departing from the disclosure herein.

In some embodiments, the interface module 322 alerts one or more of the subset-data-identification module 324 and the data-segregation module 326 that a stream of data containing one or more files is designated to be either tested or transferred. In some embodiments, the interface module 322 requests that the subset-data-identification module 324 identify or isolate select portions or subsets of data in the stream of data that are sensitive and must be concealed.

Once the identification module 324 has isolated these subsets of data, the interface module 322 in cooperation with the data-segregation module 326 channels the subsets of data along one or more alternate paths, separate from the remaining data flow. In some embodiments, the interface module 322 stores the stream of data designated for test or transfer in memory 204 (or any other non-transitory storage medium communicatively accessible (e.g. a storage device)). The other modules of the obfuscation file transfer module 124 including, e.g., the data segregation module 326, may retrieve the stream of data by accessing the memory 204 (or other non-transitory storage medium).

The identification module 324 includes code and routines for identifying portions of subset of data in the stream of data for test or transfer that are sensitive. In one example, the subset of data may identify particular names of the persons with whom the sensitive data must be transferred. For example, in the case of medical records, it is beneficial to conceal the name of patients suffering from diseases. In another example, the subset of data may include patient addresses, insurance information including premium amounts and the like. In some embodiments, the identification module 324 is a set of instructions executable by the processor 202. In another embodiment, the identification module 324 is stored in the memory 204 and is accessible and executable by the processor 202. In either embodiment, the identification module 324 is adapted for cooperation and communication with the processor 202, other components of the server 122 and other components of the obfuscation file transfer module 124.

The subset-data-identification module 324 isolates portions of data for obfuscation and encryption, so that sensitive data is not revealed to any intermediary source via which the data stream is routed. In some embodiments, the identification data isolates sensitive data and designates or tags it to be routed on a different channel than remaining data or files in the data stream The sensitive data (e.g., a particular subset of data) that is designated or tagged may be encrypted in accordance with a particular obfuscation method. In some embodiments, multiple different obfuscation methods may be used such that multiple streams of sensitive data subsets that are encrypted flow on different channels. These multiple streams of sensitive data subsets flow on the different channels in parallel and at some point may be rejoined with the remaining data or files, as designated.

The data-segregation module 326 includes code and routines for segregating or extracting the subsets of data that are designated as sensitive from the remaining data. The data-segregation module 326 separates the content data from control data and extracts the subsets of sensitive data from the content data. In this way, any data that is required by the intermediary sources 116 to complete the transfer of the data stream to its target source 130 is not obfuscated (and encrypted). In some embodiments, the data-segregation module 326 is a set of instructions executable by the processor 202. In other embodiments, the data-segregation module 326 is stored in the memory 204 and is accessible and executable by the processor 202. In either of the embodiments, the data-segregation module 326 is adapted for cooperation and communication with the processor 202, other components of the server 122 and other components of the secure file transfer module 124.

The data-segregation module 326 either extracts the control data from the content data or vice versa. The data-segregation module 326 also extracts subsets of data that are identified as sensitive by the identification module 324. For example, depending on the embodiments, the data-segregation module 326 may receive the data stream in real-time from the interface module 322 or retrieve data designated for test or transfer from the server's 122 memory 204 or any other non-transitory storage medium or source.

The data-segregation module 326 separates subsets of sensitive data for handling on an alternate communication channel or path. For example, in some embodiments relating to health-care applications, patient names, addresses, or insurance premiums may be scrambled or obfuscated.

The obfuscation-criteria-determination module 328 includes code and routines for determining the criteria by which the subsets of data isolated by the data segregation module 326 are to be obfuscated (and/or encrypted). In some embodiments, the obfuscation-criteria-determination module 328 is a set of instructions executable by the processor 202. In another embodiment, the obfuscation criteria determination module 328 is stored in the memory 204 and is accessible and executable by the processor 202. In either of the embodiments, the obfuscation-criteria-determination module 328 is adapted for cooperation and communication with the processor 202, other components of the server 122 and other components of the obfuscated file transfer module 124.

Some types of obfuscation criteria may include, but are not limited to, one or more of the following: 1) replacement of personal names with random strings; 2) replacement of addresses with nearby addresses, with postal code adjustments; 3) obliteration of the actual insurance premiums (in the health-care example) but transmittal of the limits; 4) removal of personal information from HIPAA documents but with preservation of procedure data so as to keep the valid structure of HIPAA and EDI interchanges; 5) selection of data but with randomization of dates within a certain plus or minus number of days to produce test data; and 6) encryption of all data except that necessary in the exchange envelope and that necessary for checksum calculation, and subsequent decryption.

Figure 3A:
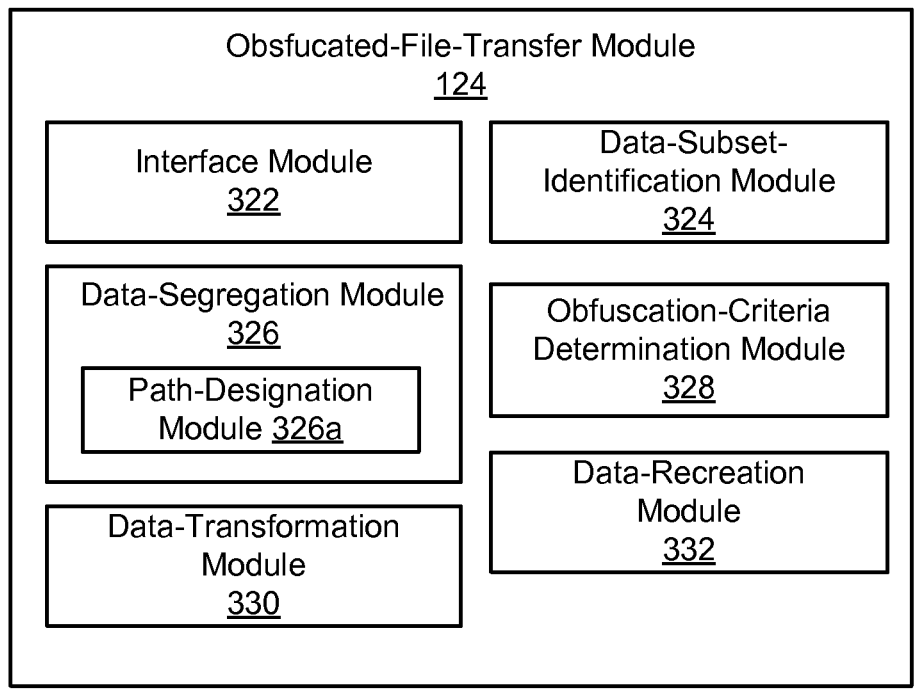
FIG. 3A is a block diagram illustrating an example obfuscation-file-transfer module according to some embodiments.
Figure 3B:
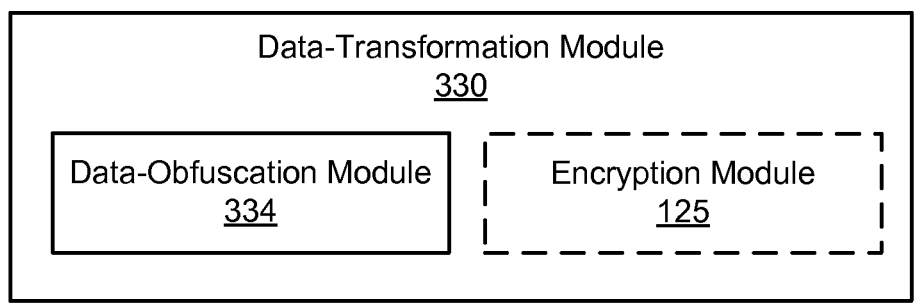
FIG. 3B is a block diagram illustrating an example data-transformation module.

Referring to FIGS. 3A and 3B, the data-transformation module 330 transforms the subsets of data that are tagged as sensitive into obfuscated files of data that are obfuscated according to the criteria that is defined by the obfuscation-criteria-determination module 328. The encryption module 125 encrypts data that is designated for encryption. For example, assume the data stream of medical records for a patient by the name of *Julia* Roberts, is received with sensitive information such as her social security numbers, and an indication of a diagnosis of one or more health conditions. The anonymity of this data is maintained by using some of the obfuscation and encryption techniques described here.

The data-transformation module 330 includes code and routines for transforming the subsets of data that are tagged as sensitive, based on the criteria identified by which the subsets of data isolated by the data-segregation module 326 are obfuscated (and/or encrypted). In some embodiments, the data-transformation module 330 is a set of instructions executable by the processor 202. In other embodiments, the data-transformation module 330 is stored in the memory 204 and is accessible and executable by the processor 202. In either of the embodiments, the data-transformation module 330 is adapted for cooperation and communication with the processor 202, other components of the server 122 and other components of the obfuscated-file-transfer module 124.

In some embodiments, the data-transformation module 330 sends subset data, via alternate channels, as designated by the server 122 for either obfuscation or encryption, as determined. For example, in one embodiment, the data-transformation module 330 stores subset data that has been obfuscated as an obfuscated file in the memory 204 (or any other non-transitory storage medium communicatively accessible, e.g., a storage device) of the server 122. The obfuscated files may be transferred through the intermediary sources 116*a* . . . *n* or not, while maintaining the privacy of the file, to either a contractor or a vendor to serve as test data. In some implementations, subset data may be either obfuscated or portions obfuscated and others encrypted. Subset data that is encrypted may be transferred through the intermediary source 116*a* . . . *n* and comprehensible at the target source 130 (FIG. 1) to only those with a key to resurrect the data.

In some embodiments, the data-recreation module 332, recreates or reunites the original or main data set, after descrambling the obfuscated subset data or decrypting the subset data, for example, once it has passed through the intermediary sources 116*a* . . . 116*n*. The data-recreation module 332 includes code and routines for either recreating or reuniting the original data flow with the subset data extracted from it. In one embodiment, the data-recreation module 330 is a set of instructions executable by the processor 202. In another embodiment, the data-recreation module 330 is stored in the memory 204 and is accessible and executable by the processor 202. In either embodiment, the data recreation module 330 is adapted for cooperation and communication with the processor 202, other components of the server 122, and other components of the obfuscated file-transfer-module 124.

The data-recreation module re-creates the packets of data received at the target data source 130. In one embodiment, for subset data that was encrypted, the data packets include an encryption key and a file identifier. For example, the data packets include the encryption key and a uniform resource location (URL) for the encrypted file associated with that encryption key. As this packet includes the encryption key used to decrypt the identified encrypted file, in one embodiment, this packet is transmitted only to the target source server 130, the final destination where users are intended to have access to the contents of the recreated data.

Depending on the embodiment, the data-recreation module 332, the data-transformation module 330 or a combination of the two may be responsible for determining that a secure and private connection is associated for transmission of a particular packet intended for a target source module 130. For example, in some embodiments, in the event the particular packet is intended for one or a group of recipients at the target source module 130, the data-recreation module 332 obtains a list of GUIDs associated with an encrypted file from the original data source 106. And, the URL of that encrypted file from the data-transformation module 330 and the encryption key for that encrypted file from the data-transformation module 330.

Example Methods

Figure 4:
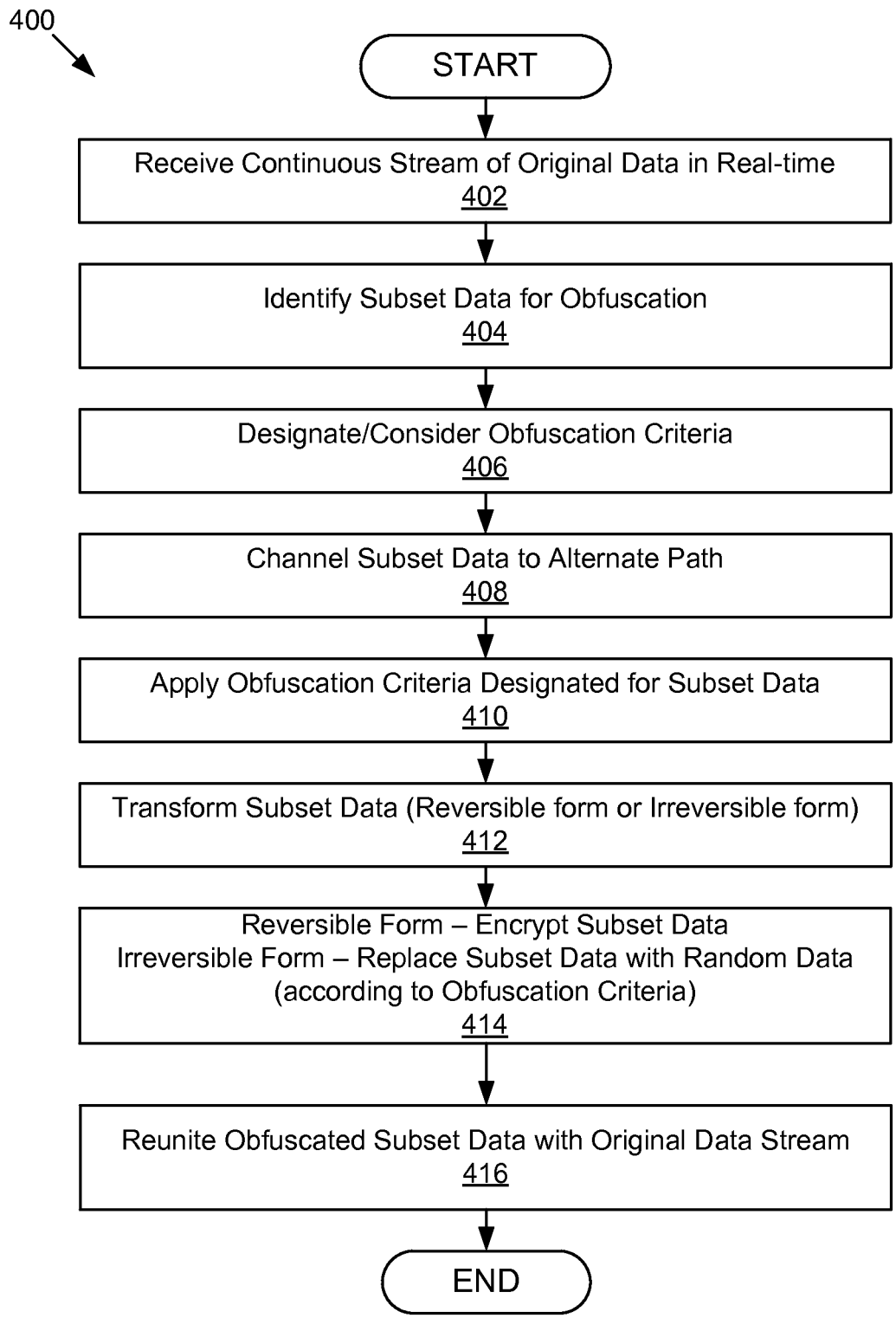
FIG. 4 is a flowchart of an example method for secure file transfer maintaining privacy and anonymity of the data, according to some embodiments.

FIG. 4 depicts method 400 performed by the system described above in reference to FIGS. 1-3. The method 400 begins at block 402. At block 402, the interface module 322 receives a continuous stream of data in real-time or alternatively may receive individual files of data. In some embodiments, the interface module 322 may access saved files of data and handle these either separately or merge them into the stream of continuous data. At block 404, the identification module 324 identifies portions or subsets of data that should be maintained private or masked from prying eyes. These subsets of data are identified to be obfuscated, either partially or entirely, depending upon the use and the sensitivity of the data. At block 406, the data-segregation module 326 either generates or designates the criteria for obfuscation of the data that was identified at block 404.

Various types of obfuscation criteria may be used. As one example, data may be obfuscated by replacing personal names with random strings. As another example, data may be obfuscated by replacing addresses within the document nearby addresses, for example, with postal code adjustments. As yet another example, data may be obfuscated, by obliterating the actual insurance premiums paid by a particular patient (in the health-care example), but transmitting the limits of the payment amounts. As yet another example, data may be obfuscated by removing personal information from HIPAA documents, but with preservation of procedure data so as to keep the valid structure of HIPAA and EDI interchanges. As another example, data may be obfuscated by selecting data, but with randomization of dates within a certain (plus or minus) number of days to produce test data. As another example, data may be obfuscated by encrypting all data except data necessary in the exchange envelope and that is necessary for checksum calculation, and subsequent decryption etc.

At block 408, subsets of data designated to be separated for obfuscation are channeled on one or more separate paths. In some embodiments, sensitive data in a particular medical record may tagged for obfuscation. This sensitive data is sent along these one or more separate paths to be handled differently. At block 410, the obfuscation criteria designated for handling of segregated data is reviewed and applied. At block 412, the data transformation module 330 transforms the segregated data, either in a reversible or irreversible form. At block 414, the data is reversibly transformed by encrypting the data or irreversibly transformed by replacing random data within a data string with predetermined data according to the obfuscation criteria or in some cases with random data. At block 416, the obfuscated data is reunited or the original data is recreated at the target data source 130.

Example Embodiments Directed to a Client-Vendor Scenario

Figure 5:
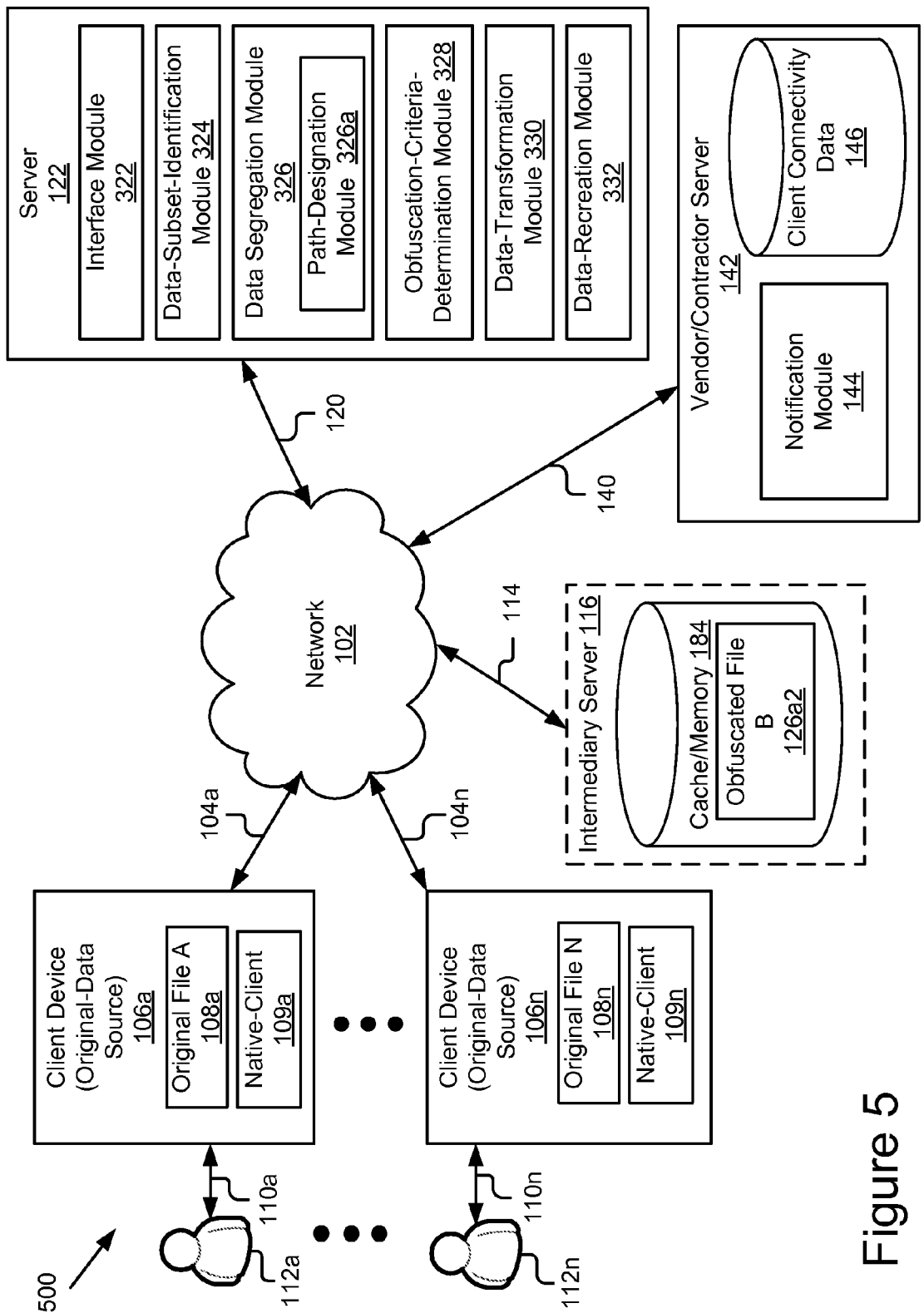
FIG. 5 is a block diagram illustrating an example client-vendor system including functionality to extract data while maintaining privacy and anonymity of the files.

FIG. 5 is a block diagram illustrating an example system for private file transfer among clients and vendors, for applications where client may desire to report a malfunction to a software vendor. In other instances, a vendor may represent a contractor retained to debug or troubleshoot operations. In such implementations, the client the vendor or contractor may extract certain data and obfuscate and encrypt it for test purposes. In these example embodiments, the example system may include a notification server. As mentioned above, system 100 as illustrated in FIG. 1 is merely an example system for performing private and secure file transfer according to some embodiments. FIG. 5 illustrates other examples of a system 500 for performing secure and private transfer of select data according to other embodiments. However, it will be recognized that still further system environments and configurations are contemplated and within the scope of the present disclosure.

The system 500 of FIG. 5 includes similar components to the system 100 of FIG. 1. Therefore, the description of the similar components is not repeated. System 500 differs from system 100 because it particularly illustrates scenarios where the original data sources 106*a* . . . 106*n* are client devices. In these implementations, the original data sources 106*a* . . . 106*n*, respectively, that is the client devices, may contain instances 109*a* . . . 109*n* of a native-client 109 (also referred to individually and collectively as native-client 109 and illustrated by broken lines). The native-client 109 may be storable in a memory and executable by a processor of the client device 106. In some embodiments, the client device 106 may also include applications for making telephone calls, video calls, messaging, social networking, gaming, capturing digital video, and/or images, authoring documents, etc. In these types of scenarios, data originating at the client device 106, or at least portions or subsets of it may be variously provided for either analysis or testing by a contractor or a vendor. For testing of data, it is desirable to allow the contractor or vendor-operator access to the control components in the original data, yet not the content data, in the event it is sensitive. In these embodiments, the original data may or may not pass through intermediary sources (these are illustrated in broken lines for that reason). In addition, the vendor (or contractor) notification server 142, in one embodiment, includes a notification module 326 and a client connectivity data unit 130.

The vendor/contractor notification server 142 may include one or more computing devices having data processing, storing, and communication capabilities. For example, the vendor/contractor notification server 142 may include one or more hardware servers, server arrays, storage devices, systems, etc., and/or may be centralized or distributed/cloud-based. In some implementations, the vendor/contractor notification server 142 may include one or more virtual servers, which operate in a host server environment and access the physical hardware of the host server including, for example, a processor, memory, storage, network interfaces, etc., via an abstraction layer (e.g., a virtual machine manager). In one embodiment, the vendor/contractor notification server 142 stores and maintains client connectivity data, which may include an identifier (e.g. a GUID) associated with a client device 106 that has initiated and maintained a connection with the vendor/contractor notification server 122. The operations of the embodiments using notifications and a vendor/contractor notification server 142 are discussed below with reference to FIG. 6.

Figure 6:
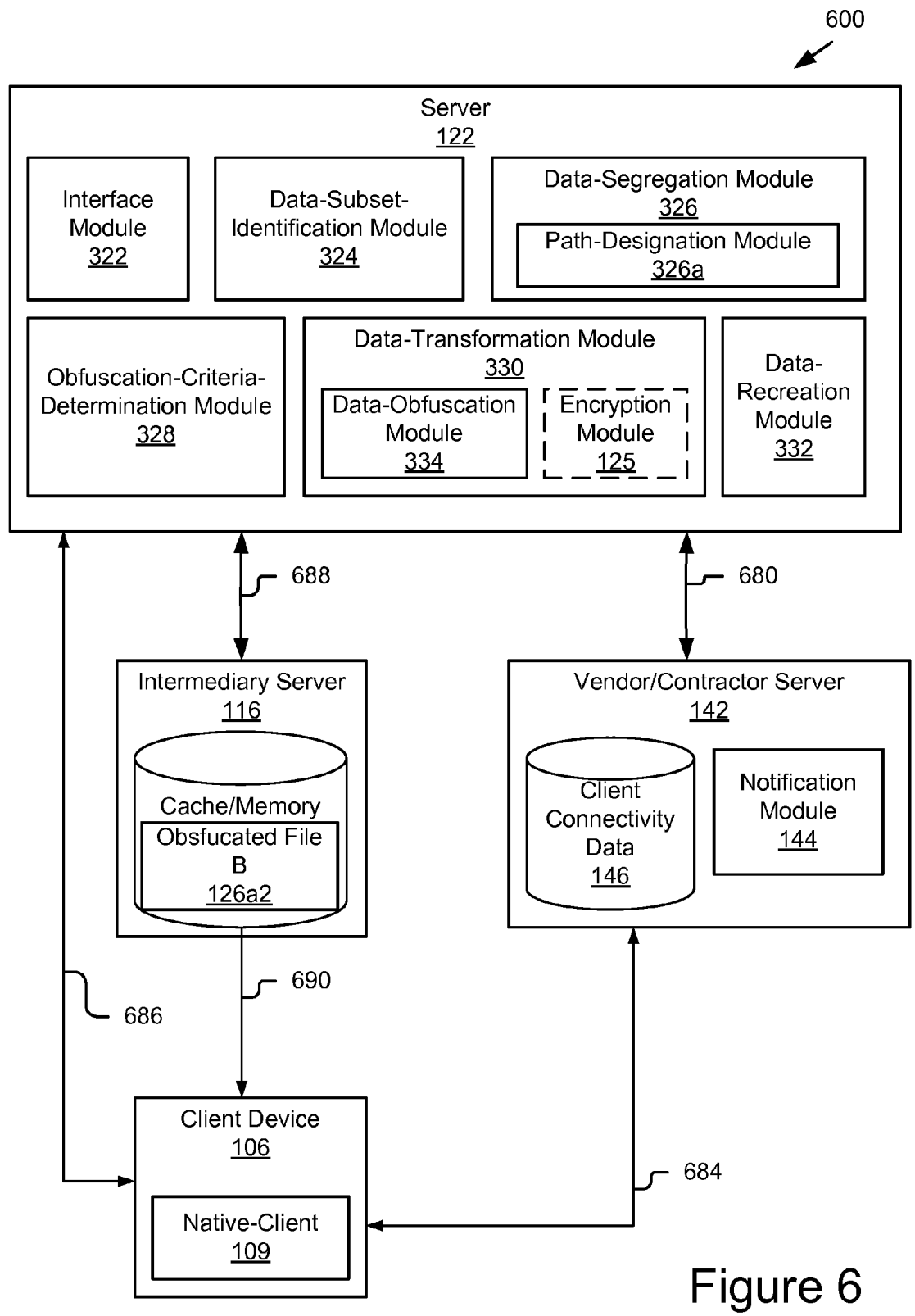
FIG. 6 is a block diagram of an example system for secure and private file transfer illustrating the communication flow.

FIG. 6 is a block diagram illustrating an example system 600 for private and secure data transfer to either a contractor or a vendor according to some embodiments. In these scenarios, the data transfer includes separating control data from content data, and obfuscating (and/or encrypting) the content data or at least a portion of it, to preserve it as private and secret. This allows a contractor to analyze data structures and fields, without comprehending the nature of the content data. In these scenarios, it is customary for the client devices 106 to be behind a firewall (not illustrated separately, but within the client devices 106), therefore, in the event of experiencing a software glitch or malfunction, a client device 106 may initiate contact with a vendor server 142, as illustrated by signal line 684. Because the client device 106 is behind a firewall, it is less likely for the vendor server 142 to initiate contact and communicate with the client device 106, because, for example, the firewall may prohibit the server 122 (which may be behind its own firewall (not shown)) from being aware of the client device's 106 existence behind the firewall. For example, a firewall may prevent a server 122 from knowing there is a client device 106 to be notified.

In one embodiment, the vendor/contractor server 142 may be a cloud-based server. As illustrated, the server 122 may communicatively couple to the intermediary server 116 in some instances and the vendor/contractor server 142, as illustrated by signal lines 688 and 680, respectively; the vendor/contractor server 142 may communicatively couple with the client device 106 as illustrated by signal line 684; and the client device 106 may communicatively couple to the intermediary server 116 as illustrated by signal line 690 and to the server 122 as illustrated by 686. In one embodiment, the connections 680, 684, 686, 688, 690 are established over the network 102 (e.g. including the Internet).

Figure 7:
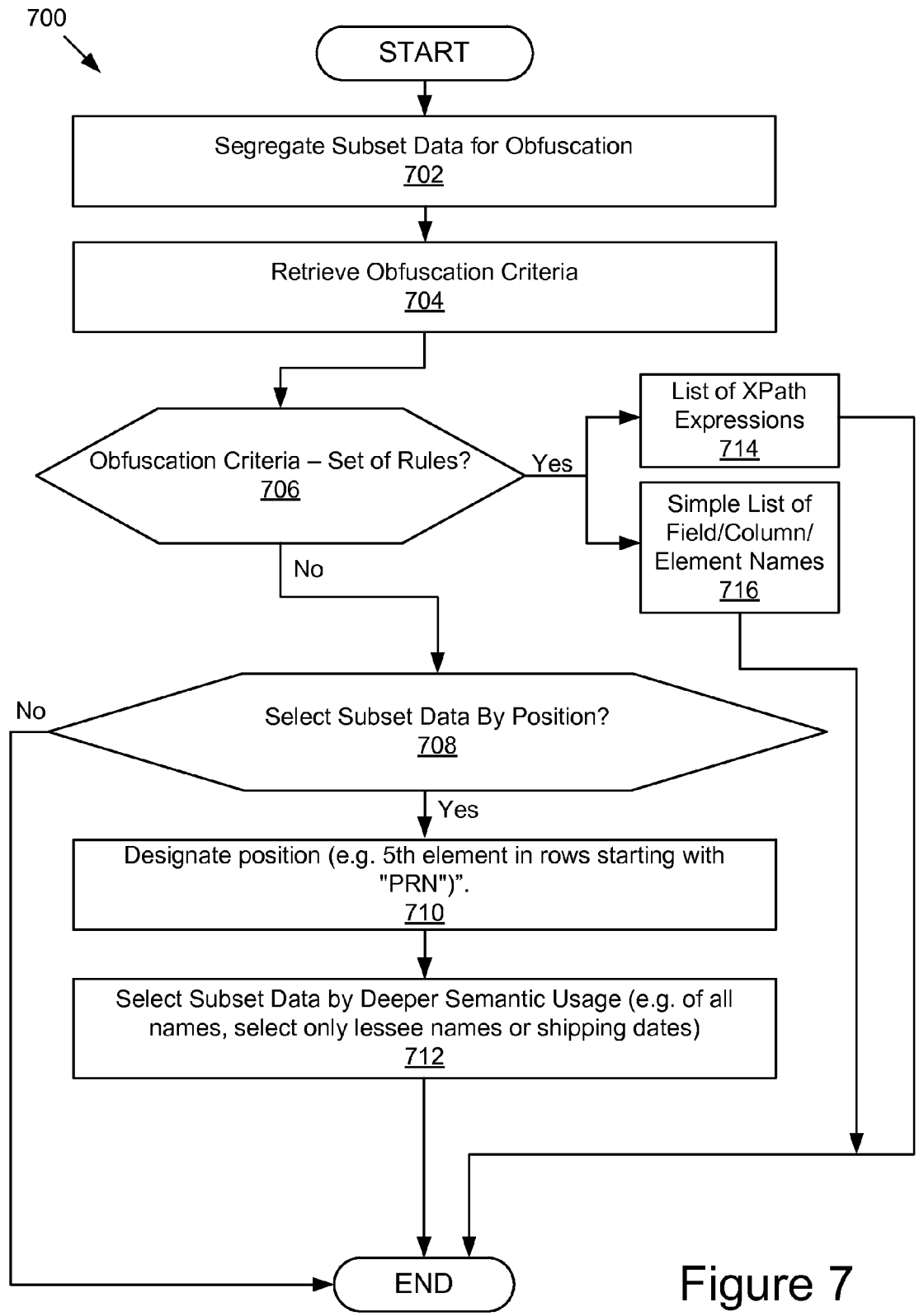
FIG. 7 is a flowchart of an example process flow illustrating an example obfuscation technique.

Referring now to FIG. 7, examples of various types of criteria and their consideration are illustrated, as indicated by reference numeral 700. In some embodiments, the obfuscation-criteria-determination module 328, at block 702, separates portions of subsets of data for obfuscation (and encryption). At block 704, the obfuscation criteria determination module retrieves the various obfuscation criteria. At block 706, one or more operations by the obfuscation criteria determination module 328 make a determination whether the obfuscation should be performed in accordance with a set of rules. To that end, in the event, the answer is affirmative, at block 714, one or operations by the obfuscation criteria determination modules determines a list of XPATH expressions as one alternative. As another alternative, at block 716, one or more operations by the obfuscation criteria determination module 328 determine a simple list of field/column/element names. Once either of these two particular types of obfuscation techniques are used, determination is made, and the operations by the obfuscation-criteria-determination module 328 proceeds to an end. In the event, at block 706, a determination is made that the obfuscation-criteria-determination module 328 will not use a set of rules, it may alternatively select data based on positions that may be specified or defined. In the event the answer is affirmative, one or more operations by the obfuscation-criteria-determination module 328 designate a position. In the illustrated example, the criteria-determination module 328 may indicate that data that is the fifth element in rows starting with "PRN" should be obfuscated. At block 712, the criteria-determination module 328 may select data by deeper semantic usage. As one example, according to the illustrated example, in the instance of all names, only the lessee names are selected, or the shipping dates.

Figure 8:
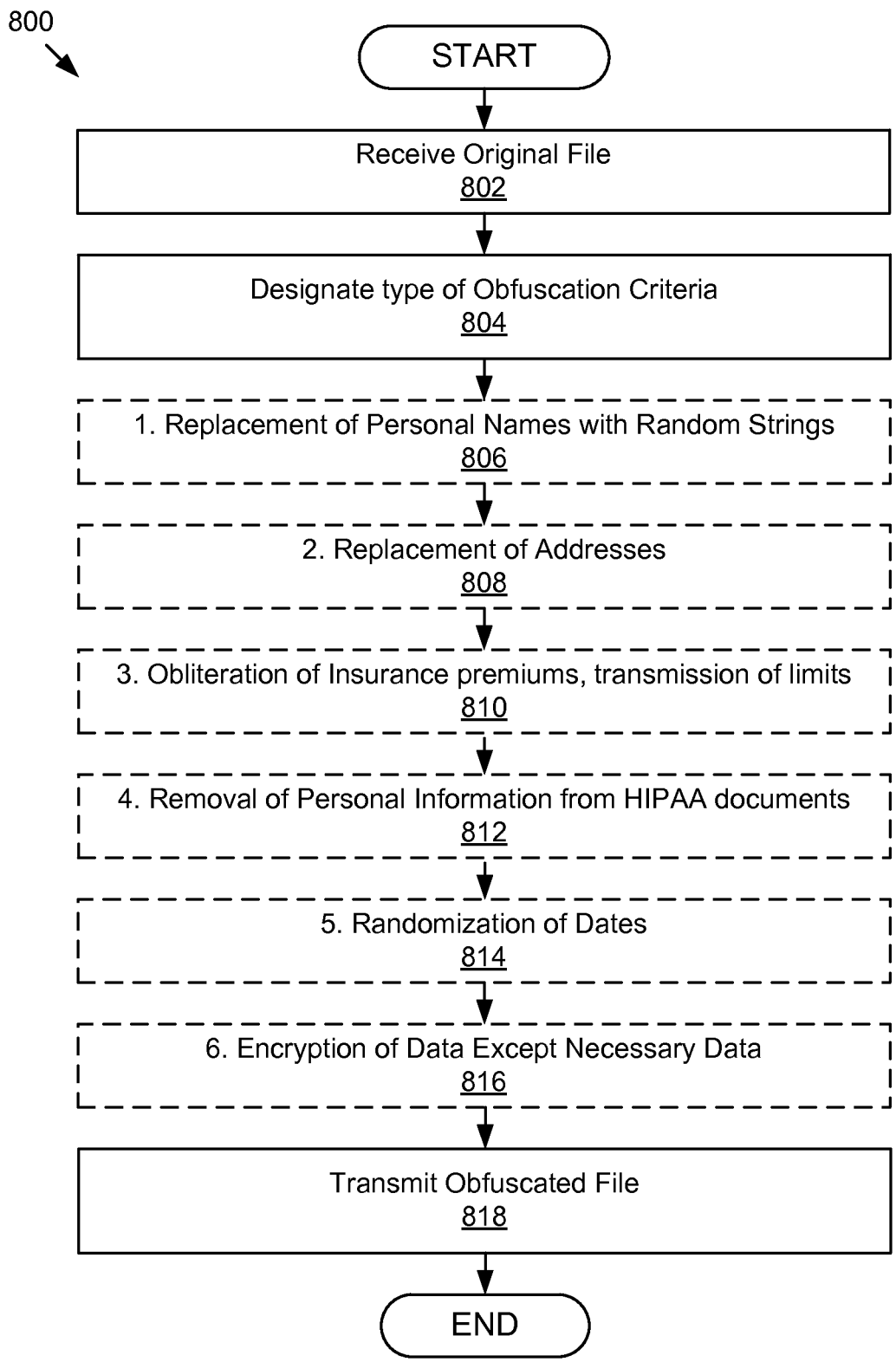
FIG. 8 is a flowchart of an example process flow illustrating the various ways of obfuscating select data or files, according to some embodiments.

Referring now to FIG. 8, the obfuscation-criteria-determination module 328 may apply a myriad criteria and techniques to obfuscate data, including, but not limited to those described here. At block 802, the obfuscation-criteria-determination module 328 considers the stream of data received in real-time, either continuously or not (by the interface module 322). Before this data is either transferred to another source or isolated for testing, select subsets of data within the stream are identified and isolated, for obfuscation to maintain the privacy of the data. In some embodiments, these operations are performed by the identification module 324 in cooperation with the data-segregation module 326. At block 804, the type of obfuscation is designated, for example, by the obfuscation-criteria-determination module 328. The various techniques for obfuscation are illustrated in broken lines as they are optional. Any one or more techniques may be used. As illustrated at block 806, one type of obfuscation technique involves replacement of personal names with random strings, for example names of others or any other random data. At block 808, another type of obfuscation technique involves replacement of addresses. At block 810, another type of obfuscation technique involves obliteration of insurance premiums and indication of limits (in a health-care example). At block 812, another type of obfuscation technique involves removal of personal information from HIPAA documents. At block 814, yet another type of obfuscation technique involves randomization of data. At block 816, yet another type of obfuscation technique involves encryption of data except the necessary data. With using any one or more these obfuscation techniques, subsets of data from the original stream are obfuscated.

Figure 9:
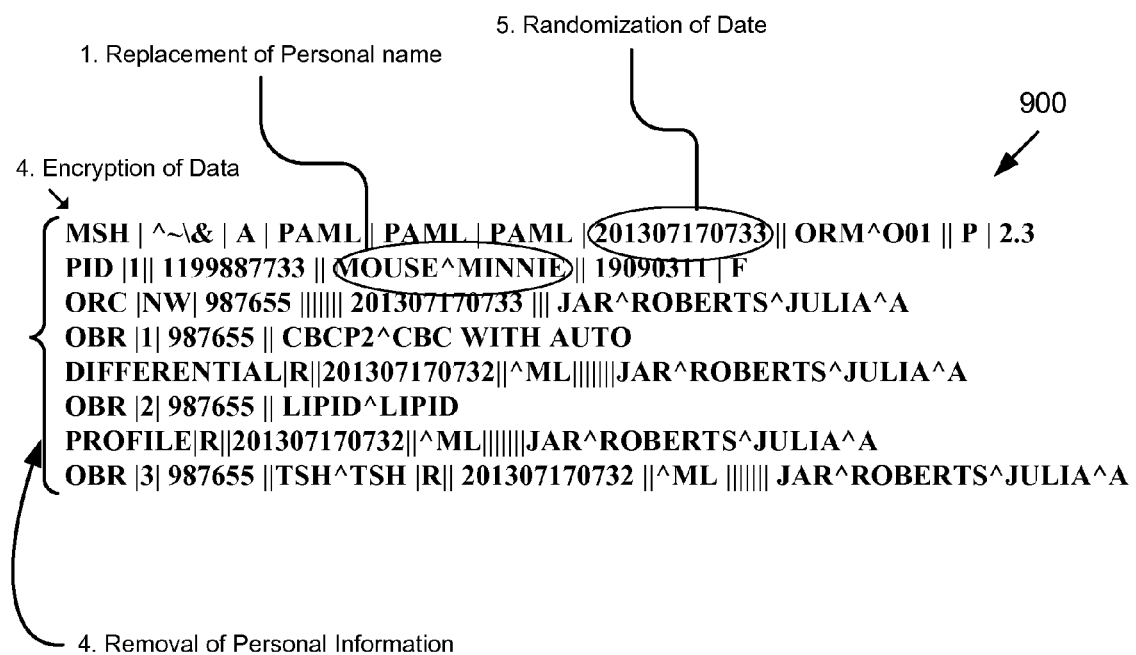
FIG. 9 is a graphical representation of example data that has been obfuscated according to some embodiments.

Referring now to FIG. 9, example data is illustrated with subsets of data obfuscated for either transmission or testing. The example data illustrated here reflects medical records for a particular patient. The example illustrated shows a specific instance of how personal data is removed, by replacement of a personal name with another random name. The illustrated example also shows an instance of randomized data and encryption of data. It should be recognized that the need to obfuscate data in the medical field is to maintain privacy for patients as medical records are frequently transferred among the various health-care providers. In addition, there are stringent review processes in the medical field. As one example, when a particular medical procedure for a particular patient is completed, the data on the patient is reviewed by a committee designated by the health-care provider. With the obfuscation system and methods that are disclosed here, in this instance, the committee would advantageously be able to use the actual medical data for the patient, with only the personal information obfuscated. The advantage of the semantic obfuscation system and methods disclosed here is that they can be easily merged into the standard health-provider systems that exist without requiring adaptation of these standard systems, as the semantic obfuscation system and methods are configured for processing the existing data structures.

Yet another use for the system and methods disclosed here is to provide data for testing of medical diagnostic coding systems. Various health-related or medical diagnostic coding systems that are configured for the International Statistical Classification of Diseases and Related Health Problems are used, such as ICD-9 (International Classification of Diseases, Ninth Revision Clinical Modification), ICD-10 (International Classification of Diseases and Related Health Problems ($10^{th}$ edition), SNOMED (Systematized Nomenclature of Medicine Clinical Terms) etc. As is recognized by those skilled in the art, ICD codes are alphanumeric designations given to every diagnosis, description of symptoms and cause of death attributed to human beings. Many existing electronic health record (EHR) systems contain clinical information encoded in ICD-9-CM, ICD-10, SNOMED, or similar coding vocabularies. Also, geographical systems such as UN/LOCODE are used. In accordance with another example, the system and methods disclosed here may be configured to accept existing health applications and to operate by processing patients to determine if the system and methods disclosed here are equivalent to prior system and processes. In other words, the existing health-care processes are not impacted, as the present system and methods only perform obfuscation on a semantic layer without changing file structures and configurations.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    identifying, using one or more processors, sensitive data within a stream of data, the stream of data associated with a data set in the process of being transferred from an originating source to a target source, the data set including sensitive and non-sensitive information;
    segregating, using the one or more processors, the sensitive data from the stream of data as the data set is in the process of being transferred from the originating source to the target source to obfuscate the sensitive data before the sensitive data is transferred to the target source;
    retrieving, using the one or more processors, obfuscation criteria;
    determining, using the one or more processors, based on the obfuscation criteria, to obfuscate the sensitive data;
    obfuscating, using the one or more processors, the sensitive data based on the determination; and
    reuniting, using the one or more processors, the obfuscated sensitive data with un-obfuscated non-sensitive data in the stream of data associated with the data set in the process of being transferred from the originating source, the target source receiving a partially obfuscated version of the data set, the partially obfuscated version of the data set including obfuscated sensitive data, wherein a portion of content of the sensitive data, which is obfuscated, in the partially obfuscated version of the data set received by the target source, remains obfuscated and inaccessible to the target source.

2. The method of claim 1, wherein the data is test data.

3. The method of claim 1, wherein the stream of data is a continuous stream of data.

4. The method of claim 3, wherein the sensitive data is unencrypted at the target source and the obfuscated, sensitive data remains obfuscated at the target source.

5. The method of claim 1, comprising encrypting at least a portion of the sensitive data.

6. The method of claim 1, wherein obfuscating the sensitive data based on the determination includes using one or more specified rules for obfuscating the sensitive data to maintain anonymity of individuals associated with the data.

7. The method of claim 1, wherein the stream includes encrypted, sensitive information and unencrypted, non-sensitive information and is transmitted from the originating source to the target source via an intermediary source.

8. The method of claim 1, wherein the network is the Internet.

9. The method of claim 1, wherein operations of the method are executed by a platform-independent driver at the originating source.

10. A non-transitory computer-readable storage medium storing computer-executable program code for automatically maintaining privacy of a stream of data as it is transmitted over a network, the computer-executable program code comprising instructions to:
    identify sensitive data within a stream of data, the stream of data associated with a data set in the process of being transferred from an originating source to a target source, the data set including sensitive and non-sensitive information;

segregate the sensitive data from the stream of data as the data set is in the process of being transferred from the originating source to the target source to obfuscate the sensitive data before the sensitive data is transferred to the target source;

retrieve obfuscation criteria;

determine, based on the obfuscation criteria, to obfuscate the sensitive data;

obfuscate the sensitive data based on the determination; and reunite the obfuscated sensitive data with un-obfuscated non-sensitive data in the stream of data associated with the data set in the process of being transferred from the originating source, the target source receiving a partially obfuscated version of the data set, the partially obfuscated version of the data set including obfuscated sensitive data, wherein a portion of content of the sensitive data, which is obfuscated, in the partially obfuscated version of the data set received by the target source, remains obfuscated and inaccessible to the target source.

11. A system comprising:

one or more processors; and a memory including instructions that, when executed by the one or more processors cause the system to:

identify sensitive data within a stream of data, the stream of data associated with a data set in the process of being transferred from an originating source to a target source, the data set including sensitive and non-sensitive information;

segregate the sensitive data from the stream of data as the data set is in the process of being transferred from the originating source to the target source to obfuscate the sensitive data before the sensitive data is transferred to the target source;

retrieve obfuscation criteria;

determine, based on the obfuscation criteria, to obfuscate the sensitive data;

obfuscate the sensitive data based on the determination; and reunite the obfuscated sensitive data with un-obfuscated non-sensitive data in the stream of data associated with the data set in the process of being transferred from the originating source, the target source receiving a partially obfuscated version of the data set, the partially obfuscated version of the data set including obfuscated sensitive data, wherein a portion of content of the sensitive data, which is obfuscated, in the partially obfuscated version of the data set received by the target source, remains obfuscated and inaccessible to the target source.

12. The system of claim 11, wherein the data is test data.

13. The system of claim 11, wherein the stream of data is a continuous stream of data.

14. The system of claim 11 comprising encrypting at least a portion of the sensitive data.

15. The system of claim 14, wherein the sensitive data is unencrypted at the target source and the obfuscated, sensitive data remains obfuscated at the target source.

16. The system of claim 11, wherein obfuscating the sensitive data based on the determination includes using one or more specified rules for obfuscating the sensitive data to maintain anonymity of individuals associated with the data.

17. The system of claim 11, wherein the stream includes encrypted, sensitive information and unencrypted, non-sensitive information is transmitted from the originating source to the target source via an intermediary source.

18. The system of claim 11, wherein operations of the method are executed by a platform-independent driver at the originating source.

* * * * *